United States Patent [19]

Avanzini

[11] 4,278,404
[45] Jul. 14, 1981

[54] AUTOINDUCTIVE ELECTROMAGNETIC PUMP AND AUTOINDUCTIVE DIRECT CONVERTER FOR CONDUCTING FLUIDS, PARTICULARLY LIQUID METALS

[75] Inventor: Pier G. Avanzini, Genoa, Italy

[73] Assignee: Nira Nucleare Italiana Reattori Avanzati, Genoa, Italy

[21] Appl. No.: 17,331

[22] Filed: Mar. 5, 1979

[30] Foreign Application Priority Data

Mar. 30, 1978 [IT] Italy ............................. 12537 A/78

[51] Int. Cl.³ ......................................... H02K 44/06
[52] U.S. Cl. ......................................... 417/50
[58] Field of Search ......................................... 417/50

[56] References Cited

U.S. PATENT DOCUMENTS

| | | | |
|---|---|---|---|
| 3,273,336 | 9/1966 | Kidwell | 417/50 X |
| 3,574,485 | 4/1971 | Herman | 417/50 |
| 3,584,976 | 6/1971 | Schuster | 417/50 |
| 3,708,246 | 1/1973 | Radchenko et al. | 417/50 |
| 4,174,190 | 11/1979 | Craig et al. | 417/50 |

Primary Examiner—Carlton R. Croyle
Assistant Examiner—Edward Look
Attorney, Agent, or Firm—Robert E. Burns; Emmanuel J. Lobato; Bruce L. Adams

[57] ABSTRACT

In electromagnetic pumps and electromagnetic converters used in the nuclear field and particularly for the circulation of liquid Sodium in the circuits of the breeder nuclear reactors, the invention consisting of providing an autoinductive pump which does not need any electromagnet and may obtain a high capacity even with an alternate current supply. This pump may be used for embodiments of large size, as a matter of fact its performance improves with the increase of the size.

10 Claims, 9 Drawing Figures

AUTOINDUCTIVE ELECTROMAGNETIC PUMP AND AUTOINDUCTIVE DIRECT CONVERTER FOR CONDUCTING FLUIDS, PARTICULARLY LIQUID METALS

BACKGROUND OF THE INVENTION

The present invention relates to an autoinductive electromagnetic pump and an autoinductive direct converter. Electromagnetic pumps have been particularly studied for their use in the nuclear field and particularly for the circulation of liquid Sodium in the circuits of the breeding nuclear reactors.

Such components may be arranged in any circuit containing an electrically conducting liquid metal and consistent with an amagnetic material necessary for making the conduits.

The operation principle of electromagnetic pumps is based on the action of Laplace force generated in a conductor having an electric current therethrough, by a magnetic field.

In said pumps the conductor consists of the fluid itself subject to an action tending to move it perpendicular to the plane containing the magnetic flow lines and the current line.

The best operation conditions are obtained when the directions of the magnetic field, electric current and sliding are perpendicular two by two.

Such operation principle was used in embodying various types of electromagnetic pumps, each of them with particular features which will be considered individually.

The simplest application of the above principle is represented by the conductive electromagnetic pumps at single-phase alternate current. The conduit containing Sodium is arranged in the air core of a magnetic circuit, where a magnetic field perpendicular to the slide direction of the fluid is generated. A current is made to circulate from one side to the other of the circuit by means of two electrodes connected to an alternate voltage supply system. The driving power is produced by the interaction between an alternate current, delivered by the secondary winding of a transformer, and an alternate magnetic field generated by the secondary winding of a second transformer. The primary windings of said two systems are connected to a same supply, so as to synchronize the current and magnetic field. In this type of pump a particular care is to be taken in making the pump supports for reducing vibrations and noise effects due to the use of a single-phase alternate current. For cooling said component, the heat dissipation due to the natural convection is sufficient, provided that the Sodium temperature does not exceed 650° C.

A second type of electromagnetic pump for conducting fluids is represented by the induction electromagnetic pump.

In induction flat pumps, the conduit for the conducting fluid is of reatangular section and the input is in a three-phase alternate current. The stator windings generate perpendicular to the conduit a sliding sinusoidal magnetic field which induces currents into the liquid Sodium. The electromagnetic forces generated by the interaction between the magnetic field and the induced currents make the fluid move.

The embodiment of said components is very simple, in fact they advantageously do not include electrodes or current circulation and therefore they may be easily disassembled and removed, with the conduit kept welded to the circuit. These pumps are used with Sodium up to 600° C., but their operation improves with the decrease of temperature.

A third type of electromagnetic pump is represented by the induction annular pumps. Said pumps have such a shape that the fluid ciculates within the annular space comprised between two concentric pipes, while the three-phase stator, arranged around the outer pipe, generates radially a sliding magnetic field. That induces currents into the liquid Sodium, which reclose circularly on themselves, and the force generated by the interaction between current and magnetic field tends to make the fluid move.

Said pumps, for their particular structural arrangement, are more advisable than others for obtaining pumping units in position to offer deliveries up to some thousands of m$^3$/h with a head of 10÷15 bars.

The above mentioned types of electromagnetic pumps for conducting liquids have the following common advantages:

- simple operation, that is simple adjustment of the delivery; in fact, it is sufficient to change the supply voltage for varying the Sodium flow;
- tighness assured by the absence of penetration into the conduit, and of movable parts;
- minimum maintenance owing to said absence of movable parts;
- no problem of lubrication;
- no need of any covering inert gas, as the conduit is perfectly tight;
- operation with liquid metals up to 600° C. and in some cases to 800° C;
- mounting of the circuit in situ on the conduit by welding.

The common inconvenience of the above mentioned various types of solution is that large deliveries and remarkable heads are not available simultaneously. That restricts the range of use on primary or secondary circuits of large reactors.

OBJECTS OF THE INVENTION

In view of the foregoing the invention aims at removing the above drawback, by providing an electromagnetic pump which may be used in large size plants.

SUMMARY OF THE INVENTION

The pump according to the invention, above called 'autoinductive' pump, does not need any electromagnet and may obtain a high capacity even though having an alternate current supply. This pump may be used for embodiments of large size, as a matter of fact, its performance improves with the increase of the size.

The operation principle is based on the fact that inside a conductor having an electric current flowing therethrough, a self-generated magnetic field is developed. The maximum efficiency with the minimum size are obtained when said conductor has a reactangular section with its longitudinal direction much larger than the transversal one.

The current and magnetic field are orthogonal to each other in any point of the conductor, and that causes a field of centripetal force throughout the conductor. When said conductor is a liquid metal, same is pumped from the peripheral zones to the central ones of the tubular conduit. Said liquid metal may be contained in a toric vessel representing the secondary winding of a transformer, whereby the way of inducing the current thereinto is quite simple.

Said autoinductive electromagnetic pump may be used in the secondary circuits of highpower fast reactors, as the pump capacity is higher asmuch larger is its size, and its simplicity of construction is such that its cost, for large sizes, is by sure lower than the one of the corresponding mechanical units which moreover have problems of tightness, reliability and construction.

The autoinductive electromagnetic pump according to the invention may be as well used in the primary circuits of integrated reactors. In this case said primary circuit is formed by a pool of liquid metal which is to be made to circulate. The magnetic circuit is submerged within said pool and the primary windings are outside thereof. The liquid metal surrounding the magnetic circuit represents the short-circuit secondary winding of the transformer. In the means transversal section of said magnetic circuit a force field is generated with its highest value in the central area of the section itself. The liquid metal may be taken from said area and conveyed to any point of the reactor, thus obtaining the desired effect of circulation.

A device based on the same principle may be used for the direct conversion of thermal energy into electric energy. In order to obtain said conversion, it is necessary that the driving fluid may be a conductor in the vapour state too.

The vapours of liquid metals are generally conductors. The single liquid metal having a boiling point lower than the heat source of the reactor (500°÷550° C.) is Mercury.

The saturated vapours of Mercury have an electric conductivity near that of stainless steel. Therefore, It is necessary to obtain a Mercury thermodynamic cycle. Said cycle may be embodied by providing a generator of Sodium/Mercury vapour (very compact and little dangerous), a converter for the Mercury a condenser for the feeding pump for the vapour generator which may be of the above described type.

A system of this kind allows to obtain a saturated vapour cycle with a feeding pressure of about 10 bars and a condenser pressure around 0.05 bars. The temperature of the vapour entering the converter may be of 500°÷550° C. The thermodynamic efficiency of this cycle is around 30%%.

It is possible to obtain an MHD converter with values of efficiency very close to the unit. The converter, differently of the pump, is centrifugal and needs an exciting current to start.

BRIEF DESCRIPTION OF THE DRAWINGS

In order that the invention may be clearly understood, it will now be described, by way of example, with reference to the accompanying drawings, wherein.

DESCRIPTION OF THE PREFERRED EMBODIMENTS

Figure 1:
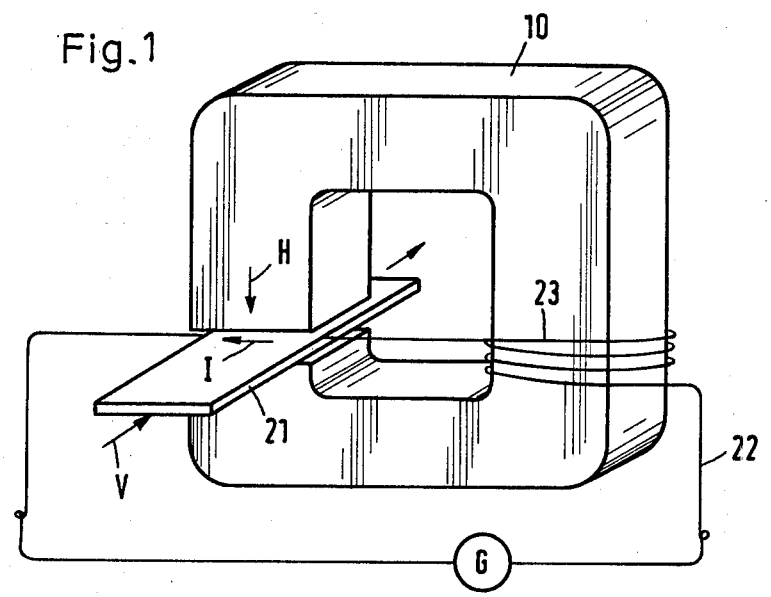
FIG. 1 shows the general operation diagrams of all the electromagnetic pumps.

In FIG. 1, which shows the operation principle of all the electromagnetic pumps, numeral 10 denotes the magnetic ring core, which is closed except for an air core or air gap relatively thin with respect to the size of element 10, wherein a flattened rectangular conduit 21 is arranged, a conducting fluid whose displacement velocity is denoted by (V) circulating within said conduit.

By (G) is denoted a curent generator feeding a conductor 22 wound around said magnetic core 10 in a winding 23, with the purpose of generating inside thereof a field (H) which in the above mentioned air core takes obviously a direction perpendicular to the minimum dimension of said air core.

The ends of said conductor 22 are electrically connected to the liquid at the sides of conduit 21 so that in the conducting fluid, which may be a vapour too, a current (I) may develop directed, as shown in FIG. 1, perpendicular to the directions of said field (H) and velocity (V) desired in the conducting fluid. As a consequence thereof, a force is generated directed in the direction perpendicular to both (I) and (H) and in this case parallel to the desired direction of (V).

Figure 2:
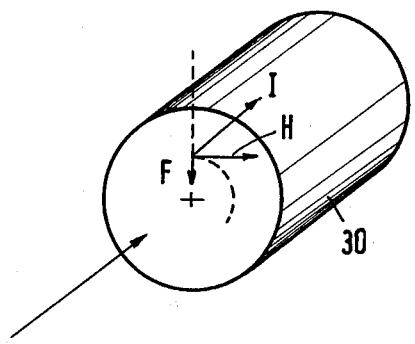
FIG. 2 shows diagrammatically the operation principle of a pump according to the invention.

FIG. 2 shows diagrammatically the operation principle of a pump according to the invention: as it is known, a magetic field (H) self-generates closed inside a conductor passed through by a current (I).

As current and magnetic field are in any point of the conductor orthogonal to each other, they generate throughout the conductor a centripetal force field (F).

If the force field is a liquid metal same is compressed, i.e. pumped, from the peripheral areas to the central areas of the tubular conduit where the liquid metal is housed.

Figure 3:
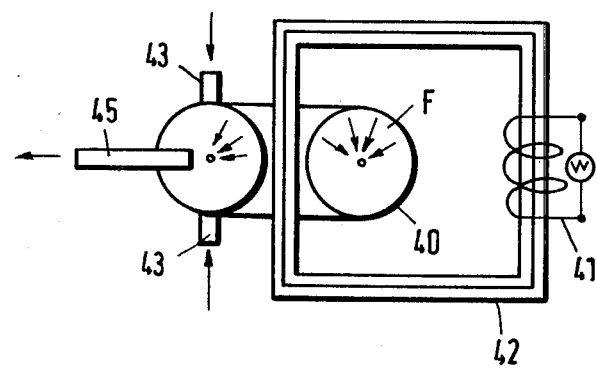
FIG. 3 shows diagrammatically a first embodiment of a pump according to the invention.

FIG. 3 shows diagrammatically a first embodiment of the invention: the liquid metal, or in general a conductive fluid, is contained within a toric vessel 40 constituting the secondary winding of a transformer whose primary winding is denoted by 41 and the ring-closed magnetic core by 42. Said toric vessel is provided with feeding conduits 43 for the liquid metal which open near the side walls of vessel 40.

The extraction conduit 45 for the liquid metal is arranged with its end near the central area of a generic cross section of said toric vessel 40 where the induced pressure by the centripetal forces (F) is higher. In consequence thereof, the liquid metal will be sucked by conduits 43 and pushed out through conduit 45.

Figure 4:
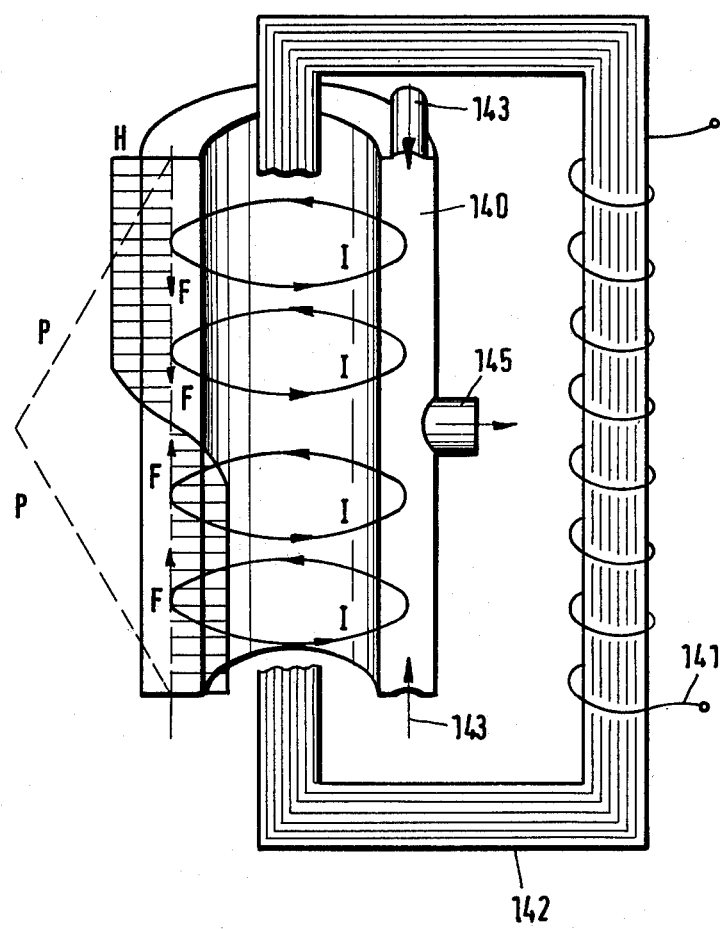
FIG. 4 shows diagrammatically a second embodiment of a pump according to the invention.

FIG. 4 is different from FIG. 3 in that the liquid metal to be pumped is contained, instead of in the toric vessel shown in FIG. 3, in an annular cyclindric vessel 140.

Still in FIG. 4, 141 is a primary winding, 142 a magnetic core, while the feeding conduits 143 for the liquid metal are arranged near the two bases of said cylindric vessel and the extraction conduit of the electromagnetic pump according to the invention, denoted by 145, is arranged on the outer surface of said hollow cylindric vessel at half of its height. In fact, the magnetic field (H) generated by current (I) is ring-closed in each of the radial sections of said vessel, and in FIG. 4 are shown its radial components generating a force (F) orthogonal to (I) and (H) which draws the liquid metal towards the central portion of the vessel from where it goes out through conduit 145.

In FIG. 4 is shown by a dotted line the diagram of pressures (P) developed inside the hollow cyclindric vessel by forces (F).

Figure 5:
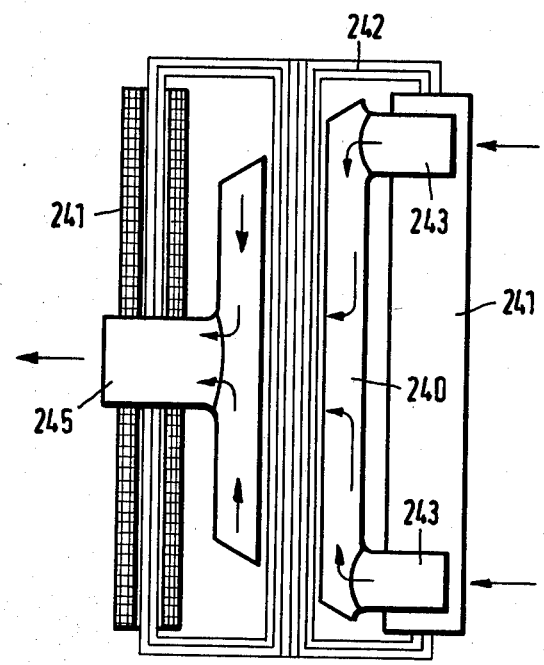
FIG. 5 is an axial section of an embodiment of the invention similar to the one shown in FIG. 4.
Figure 6:
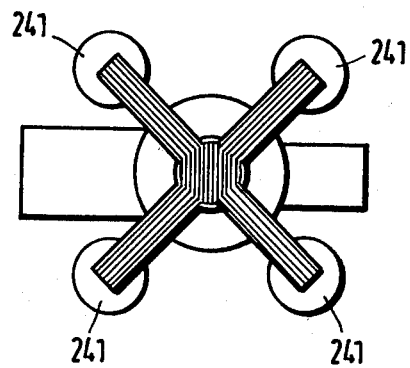
FIG. 6 is a top view of a pump as shown in FIG. 5.

FIGS. 5 and 6 show an embodiment similar to the one of FIG. 4, and this embodiment is shown less schematically. There are in this case four primary windings, each of them being interested in one fourth of said magnetic core 242 which interests the hollow cylindric vessel 240 constituting the body of said electromagnetic pump. The two bases of the hollow cylindric vessel are in this case inclined with respect to the cylinder axis, so as to favour, from the hydraulic point of view, the liquid metal to pass through said hollow cylindric vessel, from the inlet conduits 243 to the outlet or feeding conduit 245.

Figure 7:
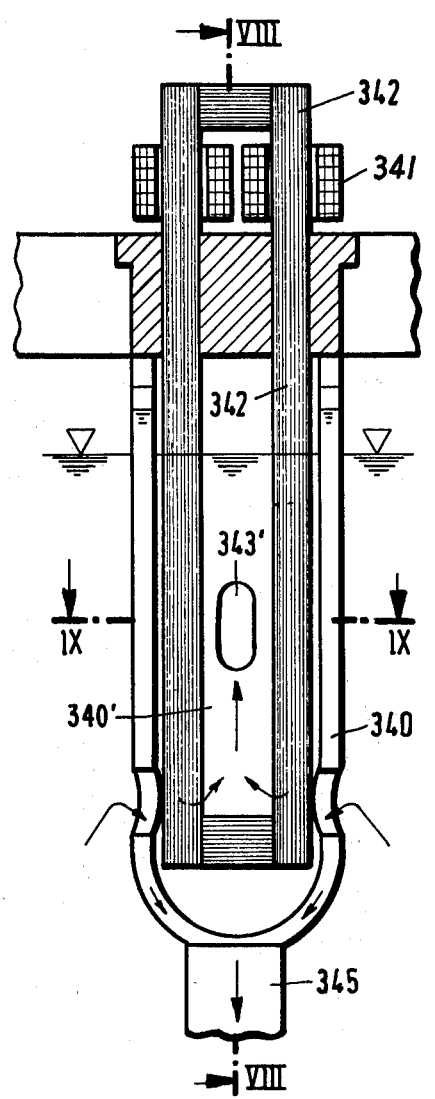
FIG. 7 is an axial section of a further embodiment of the invention, particularly suitable for pool type reactors.
Figure 8:
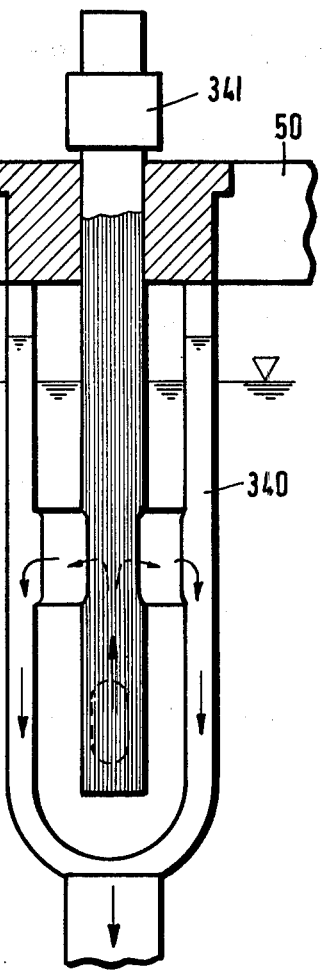
FIG. 8 is a section along line VIII—VIII of FIG. 7.
Figure 9:
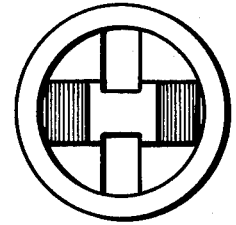
FIG. 9 is a cross section along line IX—IX of FIG. 7.

FIGS. 7 to 9 relates to the pump according to the invention being used in primary circuits of integrated reactors. In this case the reactor primary circuit consists of a bath of liquid metal which is to be made to circulate.

The pump according to the invention comprises in this case a magnetic circuit passing through the ceiling 50 of said bath 51 and extending mainly within the mass of said liquid metal. The primary windings 341 are obviously arranged outside said bath, above said ceiling 50.

The secondary winding of the transformer, represented by the pump according to the invention, is formed by an annular air space extending also below the lower end of said magnetic circuit 342.

Said vessel 340 is provided with side openings 343 for allowing said bath liquid metal to enter said central area 340' defined inside said tubular cylindric body 340. From here said liquid metal, through conduits 343' enters said tubular cylindric body 340 and is then discharged through a passage 345 provided on the bottom of said hollow cylindric body. Therefore, a mixing of the liquid metal contained in said bath 51 is obtained.

It is to be understood that the invention is not limited to the examples shown. It is intended to cover all modifications and equivalents within the scope of the appended claims.

What we claim is:

1. Autoinductive electromagnetic pump for conducting fluids comprising a substantially annular pump body where said conducting fluid, housed so in an annular space, acts as a secondary winding of a transformer, and supply conduits and at least a delivery conduit provided near the lower pressure areas and higher pressure areas respectively of said annular body; the pressure changes inside said pump annular body being generated by a force field which in every point is perpendicular to the magnetic field on one side, and to the currents circulating within the conducting fluid acting as secondary winding on the other side.

2. The autoinductive electromagnetic pump for conducting fluids according to claim 1, wherein according to a preferred embodiment said pump body has a substantially toroid shape and surrounds like a secondary winding the magnetic core of a transformer; wherein further at least a supply conduit, and preferably two supply conduits, end near the outer surface of said pump body, while at least a delivery conduit is provided with its end open near the central zone of said pump toroid body (FIG. 3).

3. The autoinductive electromagnetic pump for conducting fluids according to claim 1, wherein said pump annular body has a radial section substantially reactanguler elongated according to the axis of said annular body; and wherein at least a feeding conduit is provided near each of the two annular bases of said pump body, at least a delivery conduit being further provided near the side cylindric surface of said pump body at half of its height (FIGS. 4 and 5).

4. The autoinductive electromagnetic pump for condusting fluids according to claim 1, wherein said pump annular body is connected to an end of a transversal air space so as to obtain a first chamber of said pump body with a substantially U-shaped diametral section and a second chamber of said pump body inside the first one; the device further comprising means for conveying said conducting fluid from outside said pump body to inside said second chamber, through said first chamber, means for conveying said conducting fluid from said second chamber to said first one, and finally delivery means for said pressure fluid arranged on the outer face of said transversal air space which is part of said first chamber with a U-shaped dimetral section.

5. The autoinductive electromagnetic pump according to claim 4, wherein said means conveying said conducting fluid from outside the pump body to inside said second chamber are arranged between said transversal air space and said means conveying the conducting fluid from said second chamber and said first chamber.

6. The autoinductive electromagnetic pump according to claim 4, submerged within a vessel for said conducting fluid, perferably a conducting liquid, in order to mix it.

7. The autoinductive electromagnetic pump according to claim 4, wherein said pump body is suspended from the ceiling of said vessel for the conducting liquid to be mixed, and the magnetic core of the transformer, of which the fluid contained in said pump body represents the secondary winding, is submerged in the conducting liquid within said second chamber.

8. An autoinductive electromagnetic pump for pumping electrically conductive fluids, comprising:
    a generally toric shell for containing in use an electrically conductive fluid to be pumped;
    a magnetic core having a straight portion extending through said toric shell and coinciding with an imaginary axis of revolution of said toric shell;
    means for developing an alternating magnetic field within said straight portion of said magnetic core;
    means for introducing an electrically conductive fluid into said toric shell; and
    means for defining an outlet for electrically conductive fluid within said toric shell in regions deep within said shell.

9. An autoinductive electromagnetic pump for pumping electrically conductive fluids, comprising:
    a generally cylindrical shell for containing in use an electrically conductive fluid to be pumped, said shell comprising an outer cylindrical wall and an inner cylindrical wall disposed within said outer cylindrical wall aligned within and concentric with said outer cylindrical wall for defining a cylindrical fluid receiving space between said outer and said inner walls;
    a magnetic core having a straight portion disposed within the space enclosed by said inner cylindrical wall extending along the length of said inner cylindrical wall and coinciding with an imaginary longitudinal axis of symmetry of said inner cylindrical wall;

means for developing an alternating magnetic field within said straight portion of said magnetic core;

means for introducing an electrically conductive fluid into said cylindrical shell; and means for defining an outlet for electrically conductive fluid within said cylindrical shell in regions generally midway between opposite ends of said cylindrical shell.

10. An autoinductive electromagnetic pump for pumping electrically conductive fluids in a fluid pool, comprising:

a generally cylindrical shell comprised of an outer cylindrical wall, an inner cylindrical wall disposed within said outer cylindrical wall aligned with and concentric with said outer cylindrical wall for defining a cylindrical space between said outer and inner cylindrical walls, said inner cylindrical wall having a closed end for preventing fluid within the space enclosed by said inner cylindrical wall from flowing out of said closed end, said outer cylindrical wall having an open end portion proximate said closed end portion of said inner cylindrical wall for permitting fluid within the cylindrical space between said outer and inner cylindrical walls to flow out through said open end portion of said outer cylindrical wall, a conduit extending between said outer cylindrical wall and said inner cylindrical walls for permitting fluid to flow through said conduit from outside of said outer cylindrical wall into the space enclosed by said inner cylindrical wall without flowing into the cylindrical space between said outer and said inner cylindrical walls, and said inner cylindrical wall having an opening therethrough for permitting fluid to flow from within the space enclosed by said inner cylindrical wall through said opening into the cylindrical space between said outer and said inner cylindrical walls;

a magnetic core having a portion extending into the space enclosed by said inner cylindrical wall; and means for developing an alternating magnetic field within said magnetic core.

* * * * *